US008380207B2

(12) United States Patent
Tong et al.

(10) Patent No.: US 8,380,207 B2
(45) Date of Patent: Feb. 19, 2013

(54) LONG TERM EVOLUTION TO UNIVERSAL MOBILE TELECOMMUNICATIONS SYSTEM FEMTO MOBILITY

(75) Inventors: Yonghui Tong, Alpharetta, GA (US); Inderpreet Singh Ahluwalia, Austin, TX (US); Arthur Brisebois, Cumming, GA (US); Yung Choi-Grogan, Issaquah, WA (US)

(73) Assignee: AT&T Mobility II LLC, Atlanta, GA (US)

(*) Notice: Subject to any disclaimer, the term of this patent is extended or adjusted under 35 U.S.C. 154(b) by 16 days.

(21) Appl. No.: 13/032,232

(22) Filed: Feb. 22, 2011

(65) Prior Publication Data

US 2012/0214483 A1    Aug. 23, 2012

(51) Int. Cl.
*H04W 36/00* (2009.01)
*H04W 4/00* (2009.01)

(52) U.S. Cl. ......... 455/444; 455/434; 455/443; 370/338

(58) Field of Classification Search .................... 455/444
See application file for complete search history.

(56) References Cited

U.S. PATENT DOCUMENTS 8,126,496 B2 *  2/2012  Brisebois et al. ............. 455/522
2009/0325583 A1 * 12/2009  Burgess et al. ............... 455/444

FOREIGN PATENT DOCUMENTS

| EP | 2214434 | 8/2010 |
|---|---|---|
| WO | WO2008134281 | 11/2008 |
| WO | EP2117274 | 11/2009 |
| WO | WO2010/093172 | 8/2010 |

OTHER PUBLICATIONS

International Search Report and Written Opinion for PCT Application No. PCT/US2012/021612 mailed Mar. 22, 2012, 15 pages.

* cited by examiner

*Primary Examiner* — Huy C Ho
(74) *Attorney, Agent, or Firm* — Turocy & Watson, LLP

(57) ABSTRACT

A system and methodology that resolves complex mobility handling issues in Long Term evolution (LTE) networks, overlaid with Universal Mobile Telecommunications System (UMTS) macro and UMTS femtocells that share a common UMTS Absolute Radio Frequency Number (UARFCN), is provided. Moreover, an LTE user equipment (UE) includes a femto identification component that differentiates between the UMTS macro and UMTS femtocells by employing Location Area Code (LAC) data. In an aspect, the femto identification component ensures that the LTE UE connects to the UMTS femtocell as soon as the LTE UE enters the UMTS femtocell coverage area, even when the LTE radio frequency (RF) signal is deemed sufficient for communication. Further, the femto identification component ensures that the LTE UE stays connected to the LTE network, as long as possible, while outside of the UMTS femtocell coverage area.

20 Claims, 12 Drawing Sheets

LONG TERM EVOLUTION TO UNIVERSAL MOBILE TELECOMMUNICATIONS SYSTEM FEMTO MOBILITY

TECHNICAL FIELD

The subject disclosure relates to wireless communications and, more particularly, to a mechanism, which resolves complex mobility handling issues in Long Term Evolution (LTE) networks overlaid on a Universal Mobile Telecommunications System (UMTS) network, which includes UMTS femtocells that are deployed co-channel with UMTS macro cells.

BACKGROUND

Wireless communication networks have seen an explosive data growth in past few years and, in the future, are expected to see continuing growth in the Packet Switched (PS) domain. In particular, Long Term Evolution (LTE) networks, defined by the Third Generation Partnership Project (3GPP), are being deployed by service providers in response to a growing user demand for higher data rates and higher quality of service. LTE technology supports packet-based services only; however, the 3GPP standards specify a fallback for circuit switched (CS) services. Moreover, the LTE architecture provides CS fallback by reusing a CS infrastructure for provisioning of voice and traditional CS-domain services. For example, when a LTE device initiates a voice call, the call can be routed through a Universal Mobile Telecommunications System (UMTS) network, overlaid with the LTE network. Typically, a CS fallback enabled device, connected to an evolved UMTS Terrestrial Radio Access Network (E-UTRAN), can utilize a UMTS Terrestrial Radio Access Network (UTRAN) to connect to the CS domain.

In general, the LTE systems are overlaid with UMTS systems that include UMTS femtocells. In this scenario, when a UMTS femtocell is co-channel with a UMTS macro cell, a conflict can arise during CS fallback. In particular, the 3GPP LTE specification defines UMTS neighbors by employing UMTS Absolute Radio Frequency Number (UARFCN) levels. In other words, when an LTE device performs CS fallback, the LTE system provides the device with the UARFCN information and additional measurement thresholds for device to scan/tune to/attach to a UMTS neighbor cell. Thus, for UMTS macro and femtocells that share a common UARFCN, the LTE device cannot differentiate between the UMTS macro cell and the UMTS femtocell. Oftentimes, users prefer to connect to a UMTS femtocell, for example, to take advantage of reduced billing, improved network coverage, etc. Accordingly, since the LTE device cannot identify UMTS femtocell neighbors, conflicts are created during handover. Moreover, during CS fallback, conventional LTE devices reselect carriers randomly between macro and femtocells, based only on UARFCN information, which can lead to user dissatisfaction. As an example, user dissatisfaction is due to Femto access control: which can add considerable CS fallback call setup delay and potential failure, The above-described deficiencies of wireless systems are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate efficient handovers between Long Term Evolution (LTE) and Universal Mobile Telecommunications System (UMTS) networks. Specifically, the system enables an LTE user equipment (UE) to differentiate between UMTS macro and UMTS femto carriers that share a common UMTS Absolute Radio Frequency Number (UARFCN). More specifically, the system includes a femto identification component that distinguishes between a femtocell carrier signal and a co-channel macro cell carrier signal based in part on a location area code associated with the femtocell carrier signal. The femto identification component compares the location area code associated with the femtocell carrier signal and/or a disparate location area code associated with the macro cell carrier signal, with a femto location area code range and/or the macro location area code range, to facilitate identification of the femtocell. Further, the femto identification component triggers a measurement of neighboring cell carriers in response to detection of a wireless fidelity connection established by the user equipment.

Another aspect of the disclosed subject matter relates to a method that can be employed to facilitate efficient LTE to UMTS mobility. The method comprises preloading a femto LAC range within a UE, during idle mode and utilizing the femto LAC range to distinguish between co-channel UMTS macro and femtocells. In one aspect, the methodology includes receiving location area codes of a plurality of co-channel neighboring cells, comparing the location area codes with a femto location area code range, and determining a neighboring cell associated with a location area code that is within the femto location area code range.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
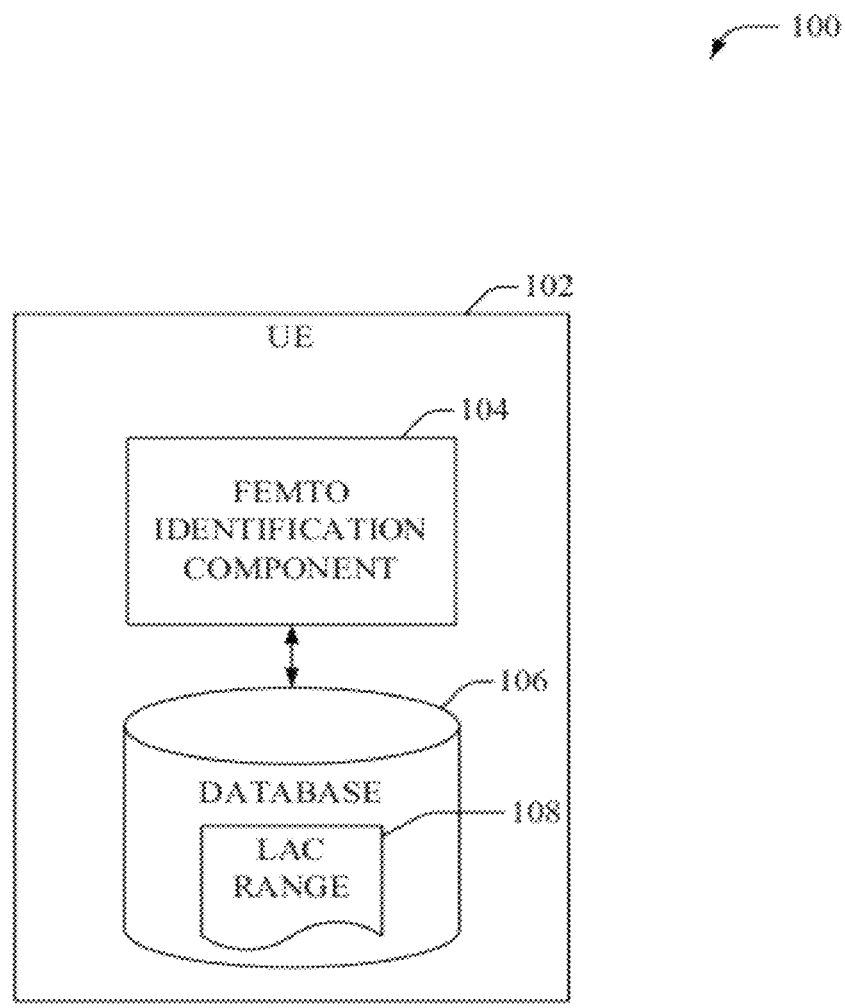
FIG. 1 illustrates an example system that can provide efficient handovers between Long Term Evolution (LTE) networks and Universal Mobile Telecommunications System (UMTS) networks.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "client," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell," "femto network," and "femto" are utilized interchangeably, while "macro cell," "macro network," and "macro" are utilized interchangeably herein.

Further, the terms "user," "subscriber," "customer," and the like are employed interchangeably throughout the subject specification, unless context warrants particular distinction(s) among the terms. It should be appreciated that the aforementioned terms can refer to human entities or automated components supported through artificial intelligence (e.g., a capacity to make inference based on complex mathematical formalisms), which can provide simulated vision, sound recognition and so forth. In addition, the term "service provider" and "network operator" are also utilized interchangeably in the subject application.

The Third generation partnership project (3GPP) Long Term Evolution (LTE) specification defines Universal Mobile Telecommunications System (UMTS) neighbors at UMTS Absolute Radio Frequency Number (UARFCN) levels. In other words, when a user equipment (UE) is directed to cell reselect from LTE to UMTS, the LTE system only provides UE the UARFCN information and additional measurement thresholds for the UE to scan/tune to/attach to UMTS neighbor cells. This can create a conflict when it comes to handling LTE to UMTS femtocell or UMTS macro cell reselection, for example, in scenarios when the operator prefers UE to move to UMTS femtocell, when a UMTS femtocell is available, and/or prefers the UE to not to move to UMTS macro cell when UMTS femtocell is not available. Aspects disclosed herein resolve such conflicts by employing a unique combination of UMTS LAC (Location Area Code) reservation for UMTS femtocells and UE internal logic.

Moreover, the systems and methods disclosed herein resolve complex mobility handling issues for operators that deploy a LTE network overlaid with a UMTS network that consist of both UMTS macro cells and UMTS femtocells, wherein the UMTS femtocells are co-channel (e.g., utilize the same frequency) with the UMTS macro cells. In one aspect, the system ensures that an LTE UE is connected to a neighboring UMTS femtocell as soon as the LTE UE enters the UMTS femtocell coverage area, even if the LTE radio frequency (RF) signal is deemed sufficient for communication, and the LTE UE connects to the LTE network, rather than the UMTS macro network, as long as possible, while outside of the UMTS femtocell coverage area.

It can be appreciated that aspects, features, or advantages of the subject innovation can be exploited in substantially any wireless communication technology; e.g., Universal Mobile Telecommunications System (UMTS), Global System for Mobile Communications (GSM), Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that can provide efficient mobility handovers between LTE and UMTS networks, according to an aspect of the subject innovation. System 100 provides a UE 102 that can communicate via the LTE network. Typically, the UE 102 can include most any LTE-based electronic device, such as, but not limited to, a cell phone, a PDA (personal digital assistant), a media player, a digital camera, a media recorder, a laptop, a personal computer, a printer, a scanner, a tablet, a GPS module, a gaming module, etc. Further, the UE 102 can also include most any LTE-based appliances that can be employed, for example, in a home, office, building, retail store, restaurant, hotel, factory, warehouse, etc. It can be appreciated that the UE 102 can be mobile (e.g., cellular phone) and/or have limited mobility (e.g., desktop computer).

In general, for voice calls, the UE 102 can perform CS (Circuit Switched) fallback, and revert back to 3G networks (e.g., UMTS) when paged for the voice call. The UMTS network can typically include one or more UMTS macro networks and a UMTS femto network, that are co-channel, for example, share the same frequency and employ the same UMTS Absolute Radio Frequency Number (UARFCN). Moreover, when conventional LTE UEs attempt to connect to a neighboring UMTS network, a conflict occurs between a UMTS macro cell and a co-channel UMTS femtocell. In particular, the conventional LTE UEs cannot distinguish between the UMTS macro and femtocells, and randomly connects to any one network. In contrast, UE 102 facilitates recognition of a neighboring UMTS femtocell, distinguishes between UMTS macro and femtocells, and resolves the above noted conflicts during handover.

According to an embodiment, the UE 102 can include a femto identification component 104 that determines whether a neighboring UMTS cell is a femtocell or a macro cell, such that the UE 102 can camp on a femtocell and exploit the benefits offered by the femtocell. As an example, UMTS femtocells provide authorized customers with various benefits, such as but not limited to, lower billing rates, improved coverage, unlimited calling plans, femto services, etc. Thus, an authorized customer with an LTE voice call capable handset would want to camp on a UMTS femtocell as soon as he/she enters the UMTS femtocell coverage area, and stay connected to the UMTS femtocell as long as coverage from the UMTS femtocell permits. In addition, the customer would also want to use LTE services as much as possible while outside of the UMTS femtocell coverage area, rather than employing UMTS macro services. Moreover, the femto identification component 104 disclosed herein, ensures that the above conditions are satisfied.

In one aspect, the femto identification component 104 measures UMTS neighbors to find and connect to a UMTS femtocell. Typically, the femto identification component 104 determines a unique identifier, such as, but not limited to, a Location area code (LAC), associated with the neighboring UMTS cells. Further, the femto identification component 104 compares the LACs with a LAC range 108 stored within a database 106. In one example, network providers can reserve a certain range of LAC 108 to its UMTS femtocells (e.g., consumer or enterprise UMTS femtocells). Such LACs are unique identifier for UMTS femtocells and are not used in the UMTS macro cells. In one embodiment, the LAC range 108 can be pre-loaded into the UE 102 and/or received or updated by an Over the Air (OTA) update.

Moreover, if the femto identification component 104 determines that a LAC of a neighboring cell is within the femto LAC range 108, the femto identification component 104 can classify the neighboring cell as a femtocell. Accordingly, the femto identification component 104 can ensure that the UE 102 connects to the neighboring UMTS femtocell as soon as the UE 102 enters the UMTS femtocell coverage area, even when the LTE radio frequency (RF) signal is deemed sufficient. Further, the femto identification component 104 can ensure that the UE 102 stays connected to the UMTS femtocell as long as coverage from the UMTS femtocell permits. Furthermore, the femto identification component 104 can ensure that the UE 102 stays connected to the LTE network, as long as possible, while outside of the UMTS femtocell coverage area.

It can be appreciated that the database 106 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory. Further, although the subject specification describes UMTS macro and femtocells, it can be appreciated that the subject innovation is not so limited and that co-channel macro and femtocells deployed in most any communication network can be utilized.

Figure 2:
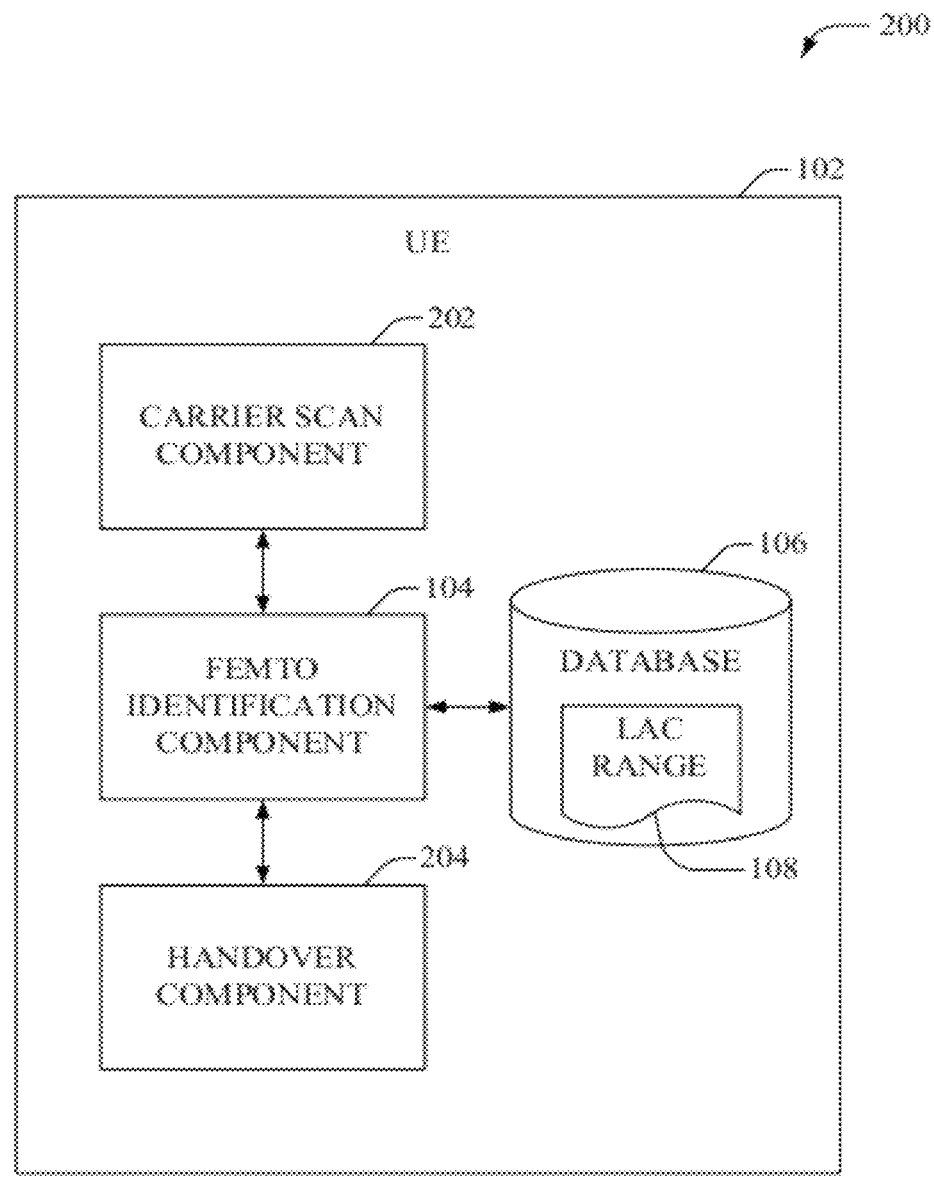
FIG. 2 illustrates an example system that can be employed for distinguishing between femto and macro cells during circuit-switched (CS) fallback in LTE networks.

Referring to FIG. 2, there illustrated is an example system 200 that can be employed for distinguishing between femto and macro cells during CS fallback in LTE networks in accordance with an aspect of the subject disclosure. It can be appreciated that the UE 102, femto identification component 104, database 106 and LAC range 108 can include functionality, as more fully described herein, for example, with regard to system 100. Moreover, UE 102 obtains LACs, broadcast on the UMTS signal, and facilitates identification of a UMTS femtocell that shares a common UARFCN with one or more UMTS macro cells. As an example, the LACs can be broadcast by a wireless communication network, over most any broadcast/control channel (e.g., Broadcast Control Channel (BCCH)).

In one aspect, a carrier scan component 202 can be utilized by UE 102 to scan neighboring carriers, for example, during CS fallback. Moreover, when UE 102 is camped on (e.g., connected to) the LTE system/network, the carrier scan component can measure UMTS neighbors signals, if the LTE RF signal strength falls below a pre-defined threshold, for example, Inter-RAT (Radio Access Technology) search triggering threshold (e.g., Trat_search). Typically, the inter-RAT search threshold (e.g., Trat_search) can be predefined, by a network provider and/or user, and can be set high enough, such that, the carrier scan component 202 can measure defined UMTS neighbors (e.g., to find and cell reselect to UMTS femtocell), even when the LTE RF signal is deemed sufficient for communication. According to an aspect, in addition to receiving the UARFCN, the carrier scan component 202 can receive LACs of the neighboring UMTS carriers. Typically, the LACs are employed by the femto identification component 104 to distinguish between macro and femto carriers.

The femto identification component 104 retrieves a LAC range 108, for example, a femto LAC range, stored in a database 106 to facilitate the identification of a neighboring femto carrier. In an aspect, if the LAC measured by the carrier scan component 202 is within the LAC range 108, the femto identification component 104 determines that the UARFCN is associated with a UMTS femtocell and accordingly instructs a handover component 204 to cell reselect and connect to the UMTS femtocell, (e.g., even if LTE RF condition is deemed acceptable). Moreover, the handover component 204 continues the process of UMTS neighbor evaluation and attempts to register onto the UMTS femtocell. In an example, a femto access point (not shown) can perform authentication (e.g., by employing a whitelist, blacklist, etc.) to determine whether the UE 102 is authorized to register on the UMTS femtocell and accordingly allow the UE 102 to connect to the femto network. If the UE 102 is authorized, the handover component 204 can complete an Inter-frequency/Inter-RAT cell reselection process and connect the UE 102 to the femtocell.

According to an embodiment, if the femto identification component 104 determines that a LAC associated with the UARFCN (e.g., received/measured by the carrier scan component 202) is not within the femto LAC range 108, the femto identification component 104 can classify the carrier as a UMTS macro carrier. In this example scenario, the femto identification component 104 can instruct the handover component 204 to terminate the evaluation/handover process and prevent an attempt to register on the UMTS carrier until various conditions are met, for example, a timer has expired or a "camping suitability" check is passed. Moreover, a timer is started when the femto identification component 104 identifies the UMTS carrier as a non-femto carrier based on its LAC (e.g. the LAC is not within the UMTS femto LAC range 108). This timer can be pre defined and/or dynamically changed to most any value, such that the UE battery consumption, for searching and measuring UMTS neighbors, is reduced. In this regard, the femto identification component 104 can instruct the handover component 204 to terminate the evaluation/handover process when the timer expires. In another example, the femto identification component 104 can instruct the handover component 204 to terminate the evaluation/handover process, if the LTE cell passes a "camping suitability" check. Moreover, "camping suitability" is a condition wherein an LTE cell is deemed to be suitable for camping and service, as defined by an applicable 3GPP Standard (e.g., 36.331), or a pre-defined threshold(s) that is slightly higher than camping thresholds but still lower than IRAT search thresholds.

Accordingly, system 200 allows flexibility in deploying a UMTS femto network on same UARFCN with another UMTS macro network. Some of the advantages of this approach are that planning and/or design for UE mobility in the UMTS network when deploying UMTS femtocells is simplified and the UMTS coverage is improved and/or maximized. In addition, system 200 avoids re-designing and/or re-optimizing the UMTS femto and UMTS macro system neighbors definition and/or parameters, for operators that have already deployed UMTS femto carriers, co-channel with UMTS macro carriers. Not only can the re-designing and/or re-optimizing often be disruptive, if not managed with extreme caution, but can also increase the OPEX (operating expense). Accordingly, system 200 can prevent system downtime and reduce/minimize OPEX.

Figure 3:
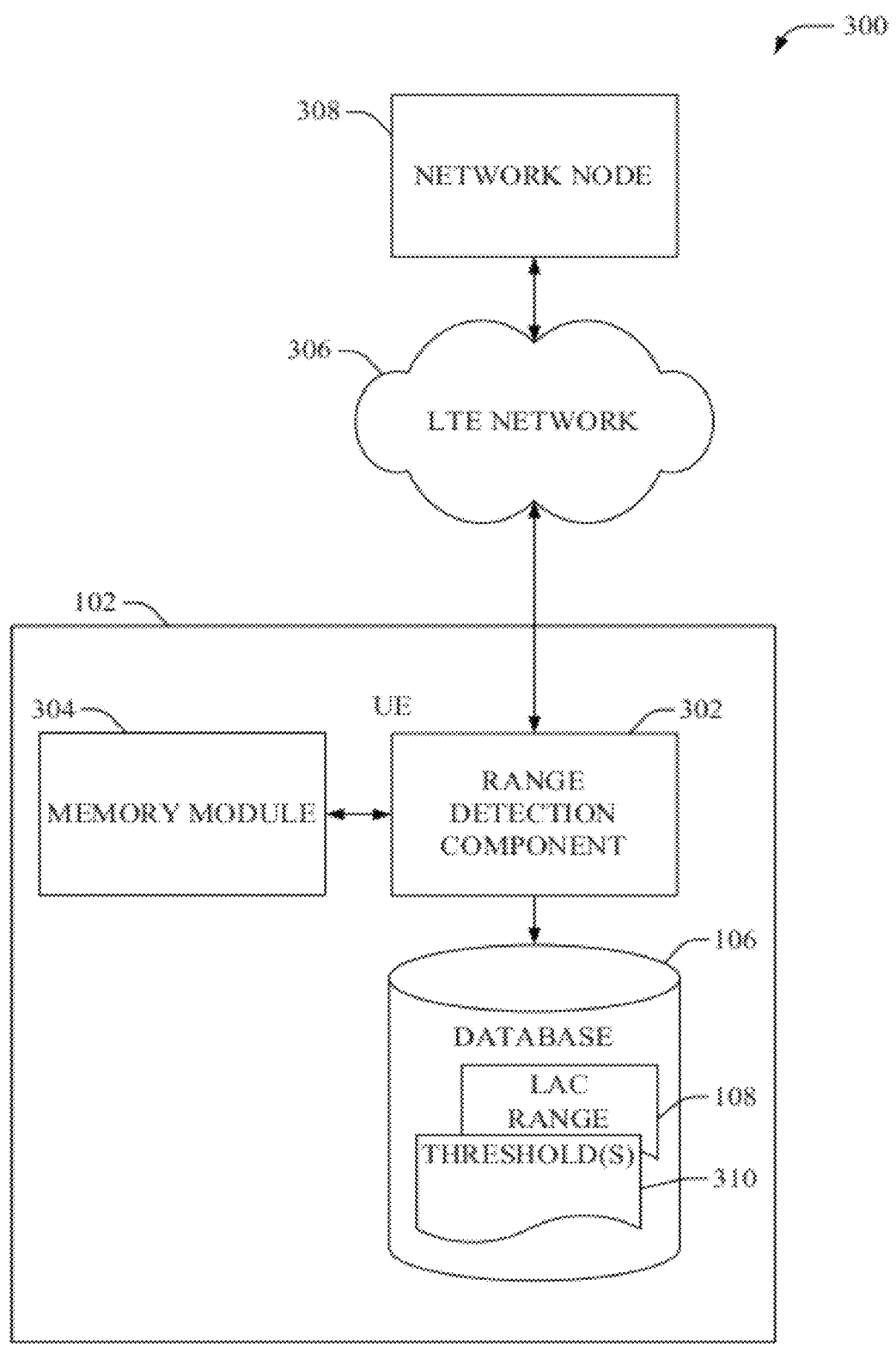
FIG. 3 illustrates an example system that facilitates femto location area code (LAC) range detection.

In one example, femtocells are typically not appropriate targets for LTE to UMTS CS fallback. Moreover, femtocells can delay CS fallback call setup at best and/or cause call setup failures at worst. This is because the UE 102 must complete femto access control during the CS fallback call setup attempt. During the CS fallback, the UE 102 has to consider and avoid redirect to a cell using the femto LAC range, and choose another UMTS cell with macro LAC range instead. Furthermore, if the LAC (femto or otherwise) previously resulted in a LAC reject (likely due to femto access control for a non-whitelisted user), the UE 102 does not attempt to access via CS fallback and uses another cell with the macro LAC range instead FIG. 3 illustrates an example system 300 that facilitates femto LAC range detection, according to an aspect of the subject disclosure. In an aspect, the femto LAC range is utilized for identification of femto carriers during neighbor evaluation/cell reselection and can include 0-N LACs (e.g., wherein N is a whole number). It can be appreciated that the UE 102, database 106, and LAC range 108 can include functionality, as more fully described herein, for example, with regard to systems 100 and 200.

Typically, a range detection component 302 can be employed to determine a LAC range, for example, a femto LAC range (and/or a macro LAC range) for femtocells (and/or macro cells) deployed by the service provider. In one aspect, the range detection component 302 can obtain the LAC range data from a memory module 304 within the UE 102, for example, a subscriber identity module (SIM), a Universal Integrated Circuit Card (UICC), a micro-SIM, Universal Subscriber Identity Module (USIM) etc. Moreover, the UE 102, can be pre-loaded/pre-programmed (e.g., during manufacture, and/or set-up) with a LAC range 108 stored within the memory module 304. As an example, the operator/service provider can reserve a certain range of LACs for UMTS femtocells (e.g., consumer and/or enterprise UMTS femtocells). In an example, the preloading/pre-programming can be achieved by defining explicit EF-FEMTO-LAC-Range (e.g., configuring an Operator PLMN List (OPL) and/or PLMN Network Name (PNN) contents) in a USIM Application Dedicated File (ADF) as defined in 3GPP 31.102.

In another example, the range detection component 302 can receive the LAC range 108 and/or update the LAC range 108 based on an OTA update. Moreover, the LAC range 108 and/or the update can be broadcast over a communication network, such as but not limited to the LTE network 306, by a network node 308. For example, the network node 308 can broadcast the defined UMTS neighbor and relevant cell reselection thresholds 310 in a system information block 6 (SIB) to the range detection component 302, via the LTE network 306. Additionally or alternately, the range detection component 302 can query/poll the network node 308 to retrieve the LAC range 108 and/or the update, via the network 306. Further, the range detection component 302 can store the LAC range 108 (e.g., received from the OTA update, and/or the memory module 304) and/or the carrier scan threshold(s) 310, such as, but not limited to the Trat_search (e.g., received from the OTA update, and/or the memory module 304), within the database 106 and/or update the LAC range 108 and/or threshold(s) 310 stored within the database 106, with LAC range data and/or threshold data received via the OTA update.

Typically, LACs within the femto LAC range can be unique identifiers for UMTS femtocells and are not utilized by the UMTS macro cells. For example, a UMTS femto LAC range can be reserved as from 1000 to 4999; and LAC range for UMTS Marco cells can be reserved from 5000 to 9999. In one aspect, the LAC range 108 can include the UMTS femto LAC range and/or the UMTS macro LAC range. In an example, when the UE 102 detects a cell with a LAC within the femto LAC range and/or outside the macro LAC range, the UE 102 can identify the cell as a femtocell and perform a Location Area Update (LAU) and/or Routing Area Update (RAU) and attempt to attach to the cell using standard signaling.

Further, in yet another example, the range detection component 302 can obtain a set of LACs associated with femtocells, to which the UE 102 is authorized to connect. For example, a network operator (e.g., via an OTA update) and/or a user (e.g., via a user interface coupled to the UE 102 and/or a femto access point) can provide the range detection component 302, a set of LACs that represent femtocells, to which the UE 102 can successfully connect. The range detection component 302 can store the set of LACs within database 106. Moreover, if the UE 102 detects a neighboring cell with a LAC that is saved within the set of LACs, the UE 102 can identify the cell as a preferred femtocell and attach to the cell using standard signaling.

Figure 4:
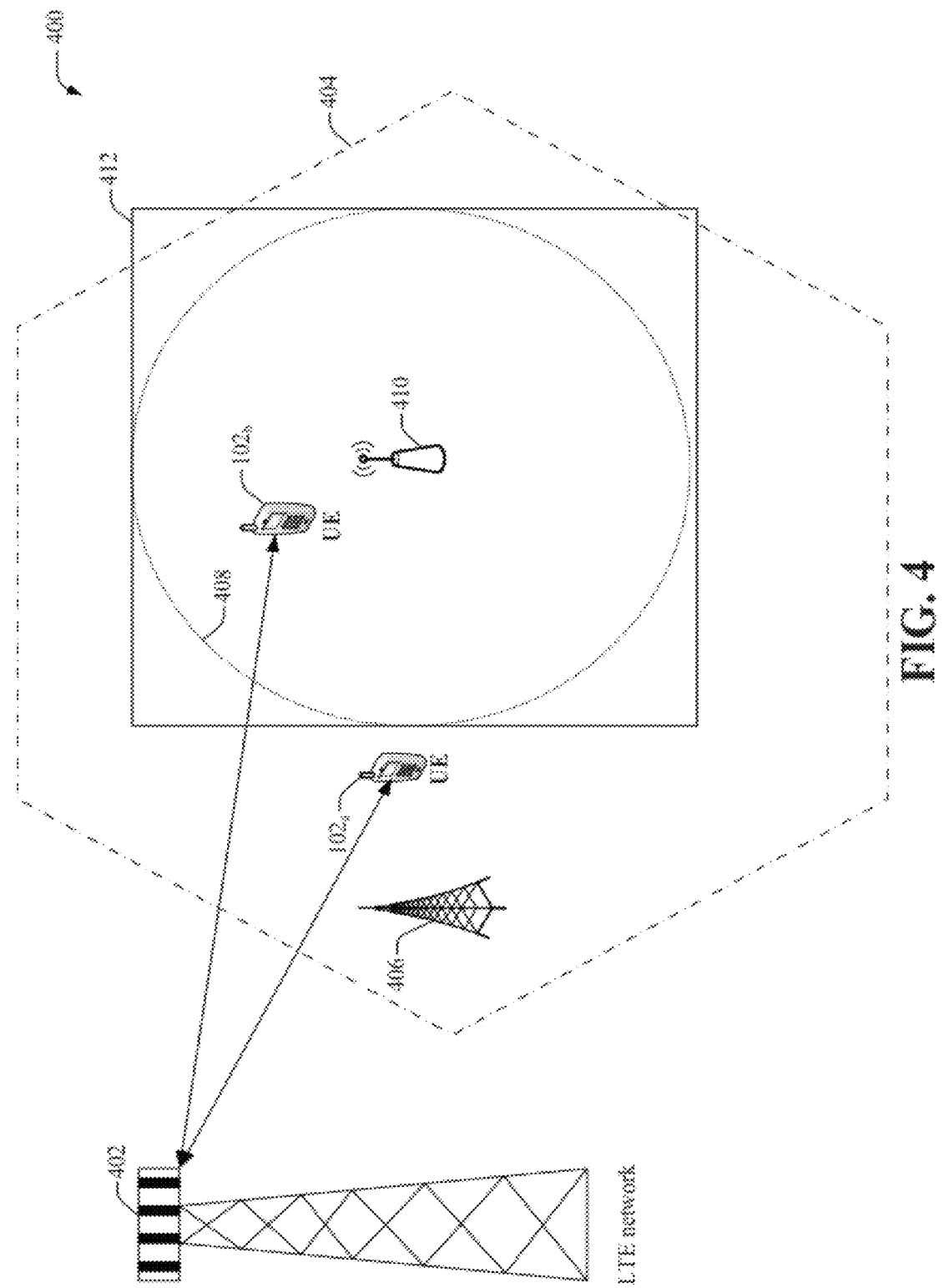
FIG. 4 illustrates an example system for improved LTE to UMTS handovers, according to an aspect of the subject specification.

FIG. 4 illustrates an example system 400 for improved LTE to UMTS handovers, according to an aspect of the subject specification. System 400 depicts an example scenario wherein an LTE network served by LTE base station 402 is overlaid in part by a UMTS macro cell 404, served by base station 406, and a UMTS femtocell 408, served by femto access point (FAP) 410. Moreover, the UMTS macro cell 404 and the UMTS femtocell 408 share a common UARFCN (e.g., co-channel). It can be appreciated that the UEs 102$_a$ and 102$_b$ can be substantially similar to UE 102 and can include functionality, as more fully described herein with respect to UE 102, in systems 100-300.

According to an embodiment, a femtocell can be served by the FAP 410 that manages femto access. As an example, the FAP 410 can be deployed in most any location 412, such as, but not limited to, a home, a workshop, an office, an airport, a library, a hospital, a retail store, salon, grocery store, etc. Typically, the FAP 410 can communicate with a UE 102$_b$, within a femtocell coverage area 408, and grant/deny femto access to the UE 102$_b$. In this example scenario, UE 102$_b$, can be authorized to connect to the FAP 410 and communicate via the femtocell. Typically, the user employing UE 102$_b$ would want to connect to the FAP 410 as soon as he/she enters the femtocell coverage area 408 and stay connected to the FAP 410 as long as coverage from FAP 410 cell permits, to take advantage of lower billing rates, improved coverage, and/or additional femto services.

Accordingly, to accommodate the above customer experience preference, an inter-RAT search threshold (e.g., Trat_search) within UE 102$_b$ is set high enough, such that, UE 102$_b$ can measure (e.g., by employing carrier scan component 202) defined UMTS neighbors to find and cell reselect to the femtocell, even when LTE RF signal is deemed sufficient. In one aspect, when UE 102$_b$ searches for neighboring cells, carrier signals from base station 406 and FAP 410, with the same UARFCN are received by the UE 102$_b$. To distinguish between the macro and the femtocells, UE 102$_b$ obtains LACs from the base station 406 and FAP 410. The LAC from the FAP 410, is within a femto LAC range (or outside a macro LAC range) stored in a database accessed by UE 102$_b$. Accordingly, based on LAC data, UE 102$_b$ can identify the carrier from FAP 410 as a femtocell carrier signal, and attempt to register on the UMTS femtocell by connecting to the FAP 410.

In another embodiment, when UE 102$_a$ is outside the femtocell coverage area 408, but within a macro cell coverage area 404, the UE 102$_a$ can detect a carrier signal from the base station 406, and identify that the LAC associated with carrier signal is not within UMTS femto LAC range (or within a macro LAC range) stored in a database accessed by UE 102$_a$. Accordingly, UE 102$_a$ can recognize the carrier signal as a macro carrier, and connect to the macro network if the LTE network fails a "camping suitability" test and a scan timer does not expire. Moreover, the UE 102$_a$ can terminate the evaluation process and prevent attempt to register on the macro carrier until one of the following conditions is met: a timer expires, wherein the timer is started when UE 102$_a$ identifies the carrier is not a femto carrier based on its LAC; or when the LTE cell fails a "camping suitability" check. Specifically, the "camping suitability" check can include conditions defined in an applicable 3GPP Standard (e.g., 36.331) wherein the LTE cell is deemed to be suitable for camping and service, or pre-defined thresholds that are slightly higher than camping thresholds but still lower than IRAT search thresholds.

Figure 5:
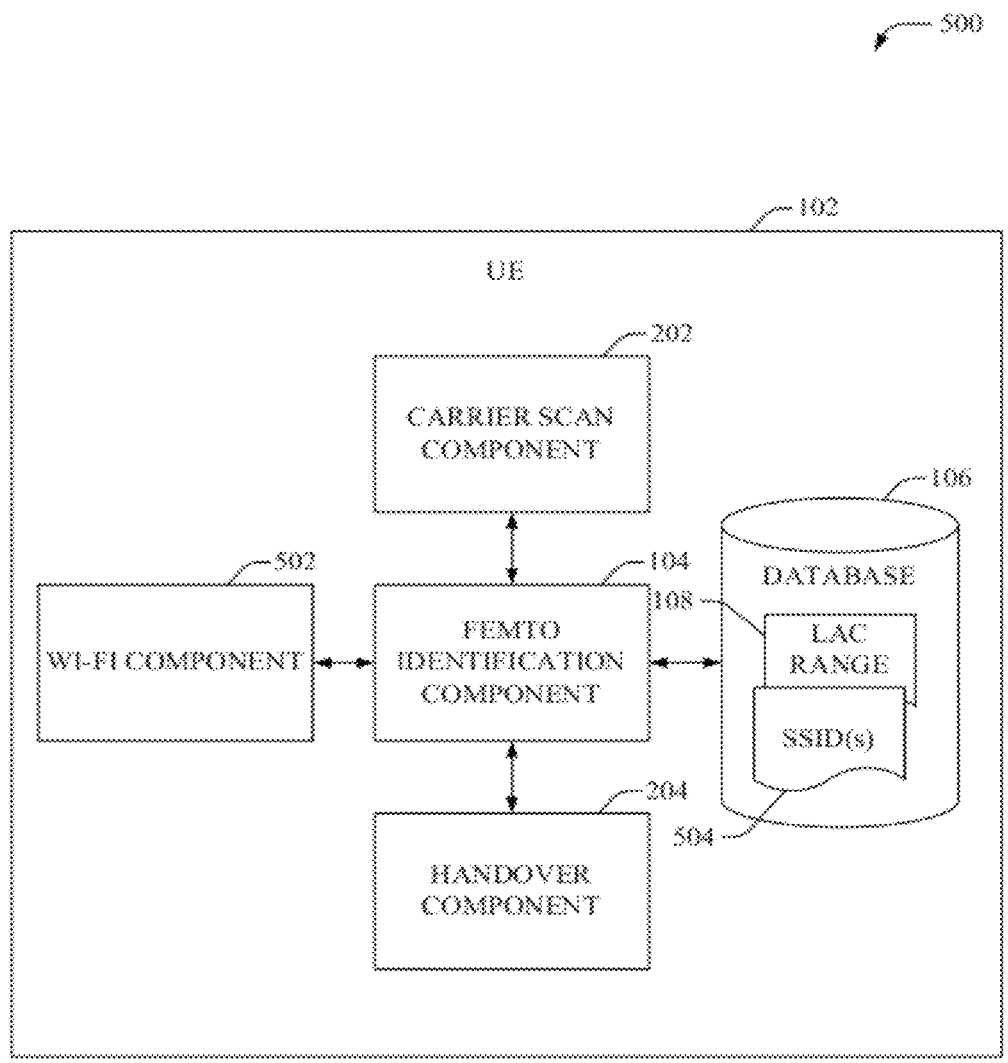
FIG. 5 illustrates an example system that employs Wi-Fi (wireless fidelity) communication for efficient LTE to UMTS femtocell handovers.

Referring to FIG. 5, there illustrated is an example system 500 that employs Wi-Fi (wireless fidelity) communication for efficient LTE to UMTS femto handovers, in accordance with an aspect of the subject disclosure. It can be appreciated that the UE 102, femto identification component 104, database 106, LAC range 108, carrier scan component 202, and handover component 204 can include functionality, as more fully described herein, for example, with regard to systems 100-400.

According to an embodiment, UE 102 includes a Wi-Fi component 502 that comprises a Wi-Fi modem (not shown), which facilitates communication over a Wi-Fi network. Typically, when a user is at home or work, the UE 102 can connect to a home or office Wi-Fi network. In general, when the UE 102 is successfully connected to Wi-Fi, there is high probability that an authorized UMTS femtocell (e.g., home femtocell or office femtocell) is nearby. The terms "authorized femtocell" and "authorized UMTS femtocell," as employed herein refers to most any femtocell that can grant femto network access to the UE 102. In one aspect, the femto identification component 104 identifies whether a Wi-Fi connection has been established by Wi-Fi component 502 and utilizes this data to trigger measurement of UMTS neighbors (e.g., by the carrier scan component 202) and search for UMTS femtocells. Typically, the Wi-Fi connection can be home Wi-Fi or non home-Wi-Fi, such as, but not limited to, public Wi-Fi, Office Wi-Fi, and/or Wi-Fi available at a friend's house (e.g., wherein the UE 102 is added to a "whitelist" of the friend's home UMTS femtocell).

Moreover, by employing Wi-Fi connection data to trigger carrier scanning, the Trat_search threshold can be kept low, such that UE 102 will measure UMTS neighbors only after LTE RF condition is deemed unsuitable for camping, thereby conserving UE battery. In one aspect, UE 102 can overrule the low Trat_search threshold when the femto identification component 104 detects a Wi-Fi connection. In addition, the database 106 can also store Wi-Fi Service Set Identifier(s) (SSID) 504 that are employed to identify a Wi-Fi network (e.g., a Wi-Fi network near an authorized femtocell). Typically, a Graphical User Interface (GUI) (not shown) can be utilized to enable a user (and/or network operator) to enter/select/define an SSID(s) associated with Wi-Fi network(s) (e.g., near/within a femtocell, to which the UE 102 is authorized to connect). For example, the user can store an SSID associated with a home Wi-Fi network within the database 106.

According to an embodiment, the femto identification component 104 can detect a successful Wi-Fi connection, based on data from the Wi-Fi component 502, and determine whether the SSID of the connected Wi-Fi network is stored within the database 106. If the SSID of the connected Wi-Fi network is stored within the database 106, the femto identification component 104 can assume that an authorized femtocell will be available and the carrier scan component 202 can trigger UMTS neighbor search logic. In contrast, if the SSID of the connected Wi-Fi network is not found within the database 106, the UE 102 will return to LTE IDLE mode. Accordingly, the femto identification component 104, utilizes Wi-Fi data to restrict a carrier signal scan to only when a high probability of an authorized femtocell available near the UE 102, is present.

Figure 6:
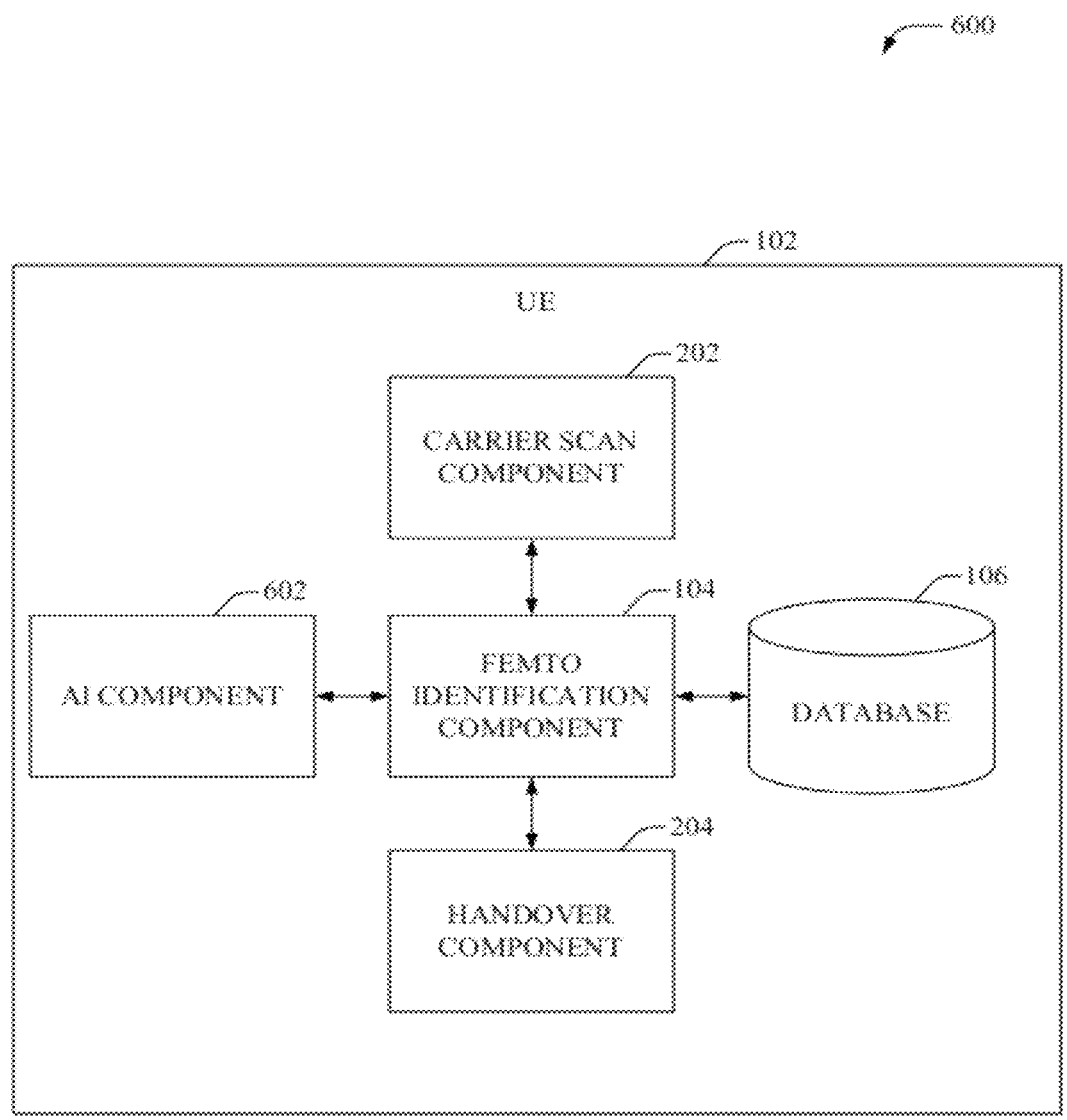
FIG. 6 illustrates an example system that facilitates automating one or more features in accordance with the subject innovation.

FIG. 6 illustrates an example system 600 that employs an artificial intelligence (AI) component 602, which facilitates automating one or more features in accordance with the subject innovation. It can be appreciated that the UE 102, femto identification component 104, database 106, carrier scan component 202, and handover component 204 can include functionality, as more fully described herein, for example, with regard to systems 100-500. The subject innovation (e.g., in connection with UMTS femtocell identification) can employ various AI-based schemes for carrying out various aspects thereof For example, a process for distinguishing between a UMTS femtocell and a UMTS macro cell carrier signal, identifying an authorized femtocell, determining when to trigger carrier scans, etc., can be facilitated via an automatic classifier system and process. Moreover, the classifier can be employed to determine whether a UARFCN belongs to a macro cell or a femtocell, whether the UE is authorized to communicate via the femtocell, whether the UE is in the vicinity of an authorized femtocell, whether a carrier scan should be triggered, etc.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information stored in database 106, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, receiving extrinsic information). For example, SVMs are configured via a learning or training phase within a classifier constructor and feature selection module. Thus, the classifier(s) can be used to automatically learn and perform a number of functions, including but not limited to determining according to a predetermined criteria a neighboring UMTS femtocell or a neighboring UMTS macro cell, whether the UE is authorized to communicate via the femtocell, when to trigger carrier scans, etc. The criteria can include, but is not limited to, historical patterns, UE behavior, user preferences, service provider preferences and/or policies, FAP parameters, location of the UE, motion of the UE, location of the femtocell, etc.

Figure 7:
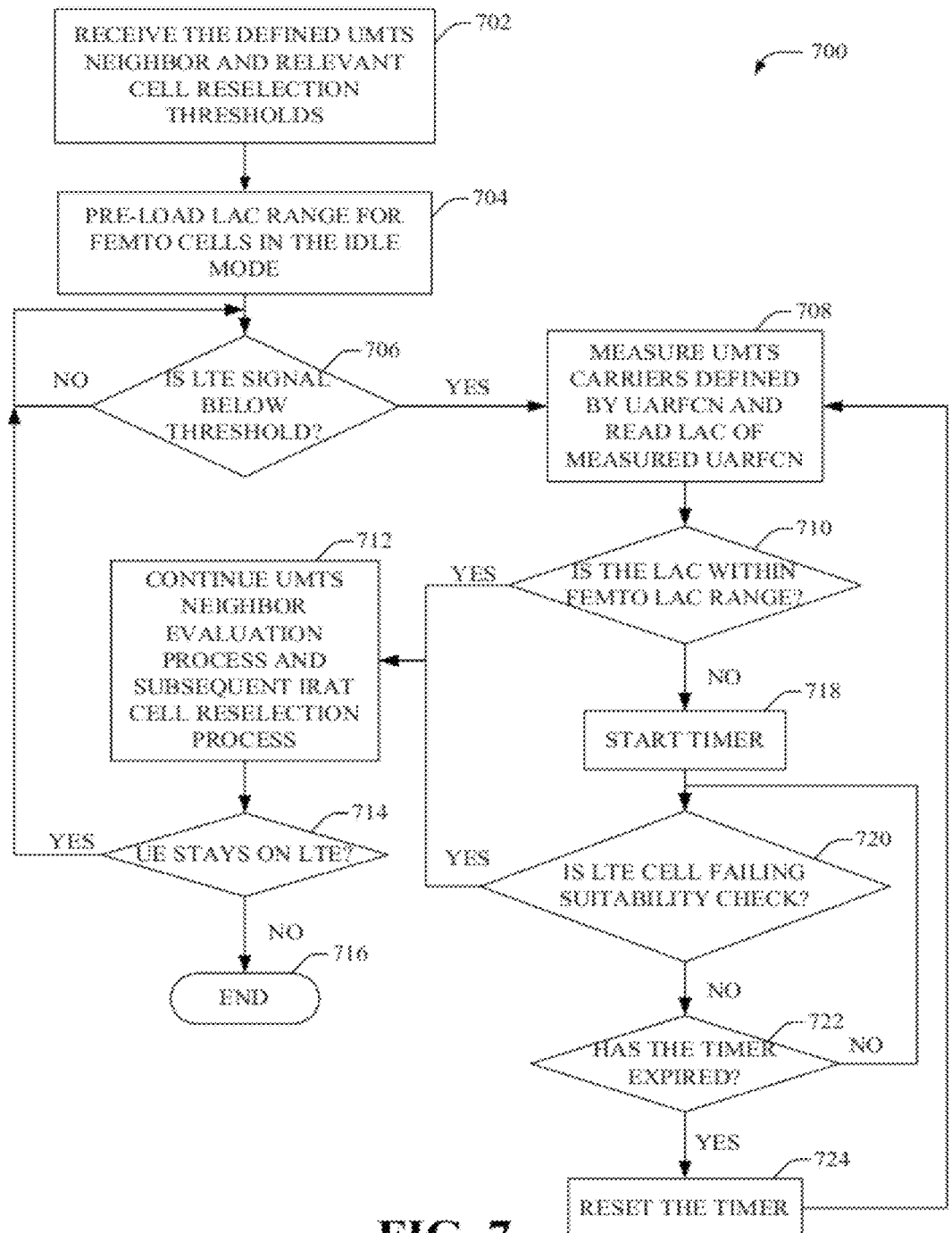
FIG. 7 illustrates an example methodology for efficient LTE to UMTS mobility during CS fallback.
Figure 8:
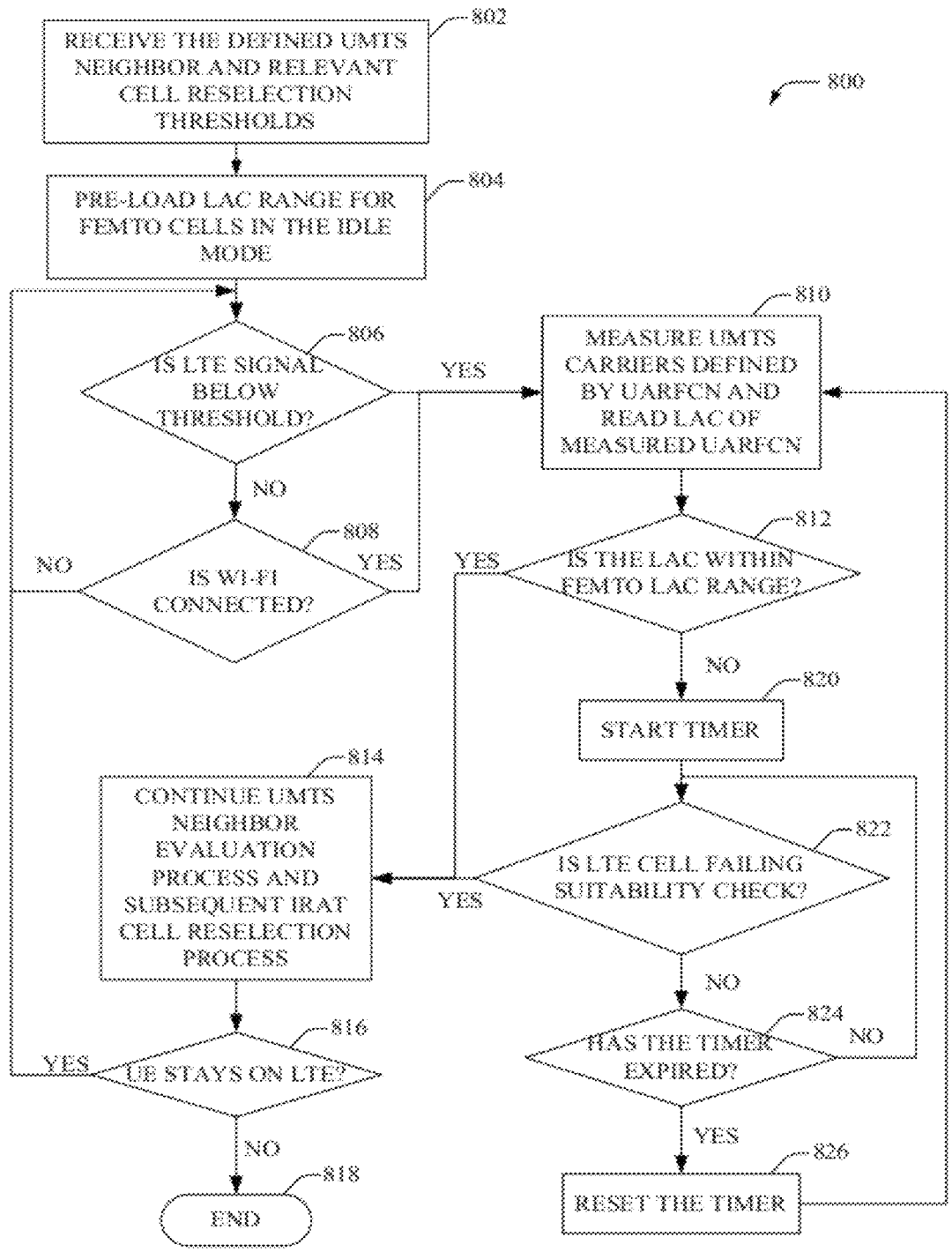
FIG. 8 illustrates an example methodology that can be utilized to facilitated LTE to UMTS handovers by employing Wi-Fi logic.

FIGS. 7-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or communications/storage media.

FIG. 7 illustrates an example methodology 700 for efficient LTE to UMTS mobility during CS fallback, according to an aspect of the subject specification. Typically, an LTE macro layer is deployed as overlap of a UMTS macro layer and UMTS femtocells are deployed within the UMTS macro layer footprint. Moreover, the UMTS femtocell shares a common UARFCN with one or several UMTS macro carriers on the UMTS macro layer. In addition, methodology 700 is typically utilized by LTE devices that are not dual radio capable (e.g., cannot simultaneously tune to both UMTS and LTE radio signal) and/or that do not support a Closed Subscriber Group (CGS) feature.

In one aspect, a network operator can define a UARFCN that can be shared by femto and macro UMTS cells in a UMTS neighbor database. Further, the LTE system can broadcast the defined UMTS neighbor and relevant cell reselection thresholds to an LTE UE. At 702, the defined UMTS neighbor and relevant cell reselection thresholds can be received, for example, in a SIB 6 message. Typically, the cell reselection threshold (e.g., Trat_search) can be set to a high value, such that, the LTE UE can measure defined UMTS neighbors to search for (and/or cell reselect to) a UMTS femtocell, even when LTE RF signal is deemed sufficient for communication. In addition, at 704, a femto LAC range (and/or macro LAC range) can be pre-loaded in an idle mode. For example, femto/macro LAC range can be obtained from a USIM or from an OTA update.

At 706, it can be determined whether the LTE signal is below the cell reselection threshold. The methodology 700 can wait until the LTE signal strength is below the cell reselection threshold, and at 708, the UMTS carriers defined by UARFCN can be measured and the LAC(s) of the measured carriers can be read. At 710, it can be determined whether, the LAC(s) are within the femto LAC range (or outside the macro LAC range). If determined that the LAC(s) are within the femto LAC range, at 712, the UMTS neighbor evaluation process and subsequent IRAT cell reselection process can be continued, for example, for the carrier whose LAC is within the femto LAC range. At 714, it can be determined whether the LTE UE can stay on the LTE network (e.g., based on femtocell authentication and/or handover results). If the LTE UE stays on the LTE network, the methodology returns to act 706; else, at 716, the methodology ends and the LTE UE is connected to the femtocell.

Alternately, if determined at 710, that the LAC(s) are not within the femto LAC range, then at 718, a timer is started. As an example, the timer can be set to most any value such that the battery consumption of the LTE UE during searching and measuring UMTS neighbors is reduced/minimized. At 720, it can be determined whether the LTE cell fails a suitability check. For example, the suitability check can ensure that the LTE cell is deemed to be suitable for camping and service, as defined by a current/applicable 3GPP Standard (36.331). In another example, the suitability check fails if the LTE signal falls below a pre-defined threshold, for example, a threshold that is slightly higher than camping thresholds but still lower than IRAT search thresholds. Moreover, if the LTE cell fails a suitability check, the methodology continues to 712, wherein the UMTS neighbor evaluation process and subsequent IRAT cell reselection process can be continued, for example, for the carrier whose LAC is outside the femto LAC range, and if the LTE UE does not stay on the LTE network, the LTE UE is connected to the UMTS macro network. However, if the LTE cell does not fail the suitability check, at 722, it can be determined whether the timer has expired. If the timer has not expired, the methodology returns to act 720 to check the LTE cell suitability. Alternately, if the timer has expired, at 724, the timer is reset to zero and the methodology returns to act 708, wherein the UMTS carriers defined by UARFCN are measured and the LAC(s) of the measured carriers are read.

Referring now to FIG. 8, illustrated is an example methodology 800 that can be utilized to facilitate LTE to UMTS handovers by employing Wi-Fi logic, according to an aspect of the subject innovation. In one aspect, an LTE network overlays femto and macro UMTS cells that share a common UARFCN. Moreover, at 802, the defined UMTS neighbor and relevant cell reselection thresholds can be received, for example, in a SIB 6 message. In one aspect, the cell reselection threshold (e.g., Trat_search) can be set to a low/normal value, since the methodology 800 utilizes Wi-Fi logic for triggering carrier scans. At 804, a femto LAC range (and/or macro LAC range) can be pre-loaded in an idle mode. For example, a femto/macro LAC range can be provided by the USIM or by an OTA update.

At 806, it can be determined whether the LTE signal is below the cell reselection threshold. If not, at 808, it can be determined whether Wi-Fi is connected. In general, when a successful Wi-Fi connection is established, there is high probability that an authorized UMTS femtocell (e.g., home femtocell or office femtocell) is nearby. If Wi-Fi is not connected the methodology returns to act 806. Alternately, if Wi-Fi is connected (e.g., UE is connected to a Wi-Fi network), or the LTE signal is below the threshold, at 810, the UMTS carriers defined by UARFCN can be measured and the LAC(s) of the measured carriers can be read. Further, at 812, it can be determined whether, a LAC of the measured carrier is within the femto LAC range (or outside the macro LAC range). If determined that the LAC is within the femto LAC range, at 814, the UMTS neighbor evaluation process and subsequent IRAT cell reselection process can be continued, for example, for the carrier whose LAC is within the femto LAC range. At 816, it can be determined whether the LTE UE can stay on the LTE network (e.g., based on femtocell authentication and/or handover results). If the LTE UE stays on the LTE network, the methodology returns to act 806; else, at 818, the methodology ends and the LTE UE is connected to the femtocell.

In one aspect, if determined at 812, that the LAC(s) are not within the femto LAC range, then at 820, a timer is started. Moreover, the timer can be set to most any value such that the battery consumption of the LTE UE during searching and measuring UMTS neighbors is reduced/minimized. At 822, it can be determined whether the LTE cell fails a suitability check, for example, as defined by a current/applicable 3GPP Standard (36.331) or based on a pre-defined threshold that is slightly higher than camping thresholds but still lower than IRAT search thresholds. If the LTE cell fails a suitability check, the methodology continues to 814, wherein the UMTS neighbor evaluation process and subsequent IRAT cell reselection process can be continued, for example, for the carrier whose LAC is outside the femto LAC range, and if the LTE UE does not stay on the LTE network, the LTE UE can be connected to the UMTS macro network. However, if the LTE cell does not fail the suitability check, at 814, it can be determined whether the timer has expired. If the timer has not expired, the methodology returns to act 822 to perform the LTE cell suitability check. Alternately, if the timer has expired, at 826, the timer is reset to zero and the methodology returns to act 810, wherein the UMTS carriers defined by UARFCN are measured and the LAC(s) of the measured carriers are read.

Figure 9:
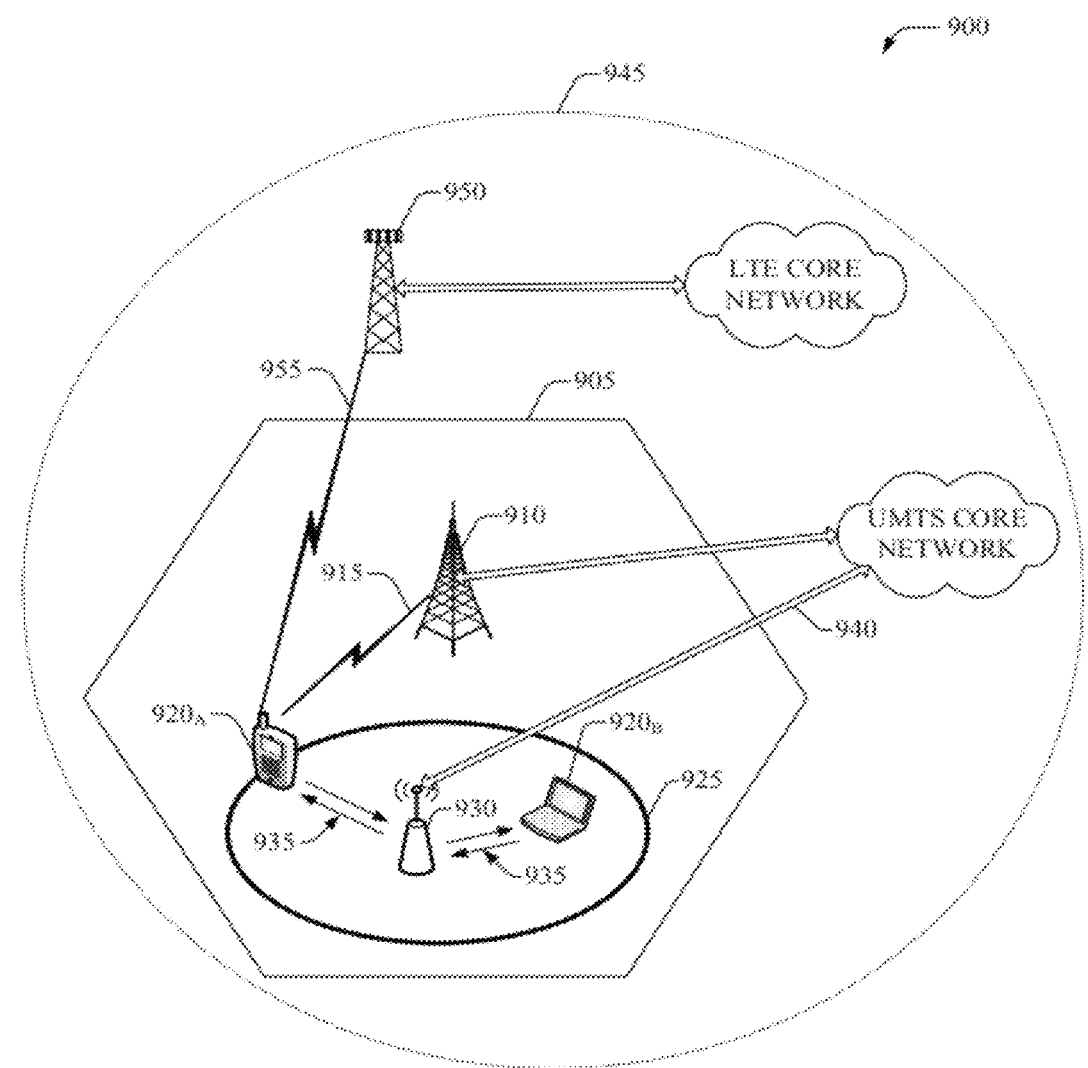
FIG. 9 illustrates an example wireless communication environment with associated components for operation of a femtocell in accordance with the subject specification.

FIG. 9 illustrates a schematic wireless environment 900 (e.g., a network) in which a femtocell can exploit various aspects of the subject innovation in accordance with the disclosed subject matter. In wireless environment 900, area 905 can represent a coverage macro cell, which can be served by base station 910. Macro coverage is generally intended for outdoors locations for servicing mobile wireless devices, like UE 920$_A$, and such coverage is achieved via a wireless link 915. In an aspect, UE 920 can be an LTE mobile device substantially similar to and including functionality associated with UE 102 described supra.

Within macro coverage cell 905, a femtocell 925, served by a femto access point 930, can be deployed. A femtocell typically can cover an area 925 that is determined, at least in part, by transmission power allocated to FAP 930, path loss, shadowing, and so forth. Coverage area typically can be spanned by a coverage radius that ranges from 20 to 50 meters. Confined coverage area 925 is generally associated with an indoors area, or a building, which can span about 5000 sq. ft. Generally, FAP 930 typically can service a number (e.g., a few or more) wireless devices (e.g., subscriber station 920$_B$) within confined coverage area 925. In an aspect, FAP 930 can integrate seamlessly with substantially any PS-based and CS-based network; for instance, FAP 930 can integrate into an existing 3GPP Core via conventional interfaces like Iu-CS, Iu-PS, Gi, Gn. In another aspect, FAP 930 can exploit high-speed downlink packet access in order to accomplish substantive bitrates. In yet another aspect, FAP 930 has a LAC (location area code) and RAC (routing area code) that can be different from the underlying macro network. These LAC and RAC are used to identify subscriber station location for a variety of reasons, most notably to direct incoming voice and data traffic to appropriate paging transmitters. Further, the LAC can be utilized to differentiate the femtocell 925 from the macro cell 925.

Typically, the macro coverage cell 905 and femtocell 925 can be overlaid by an LTE network. Area 945 can represent a coverage area of the LTE cell, which can be served by base station 950. According to an aspect, UE 920$_A$ can detect the femtocell 925 based on LAC data (and/or Wi-Fi logic). On detection, UE 920$_A$ can attach to the FAP 930 through transmission and reception of attachment signaling effected via a FL/RL 935; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 920$_A$ can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 930) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation.

When an attachment attempt is successful, UE 920$_A$ can be allowed on femtocell 925, and incoming voice and data traffic can be paged and routed to the subscriber station through the FAP 930. It is to be noted also that data traffic is typically routed through a backhaul broadband wired network backbone 940 (e.g., optical fiber backbone, twisted-pair line, T1/E1 phone line, DSL, or coaxial cable). It is to be noted that as a FAP 930 generally can rely on a backhaul network backbone 940 for routing and paging, and for packet communication, substantially any quality of service can handle heterogeneous packetized traffic. Namely, packet flows established for wireless communication devices (e.g., terminals 920$_A$ and 920$_B$) served by FAP 930, and for devices served through the backhaul network pipe 940.

Figure 10:
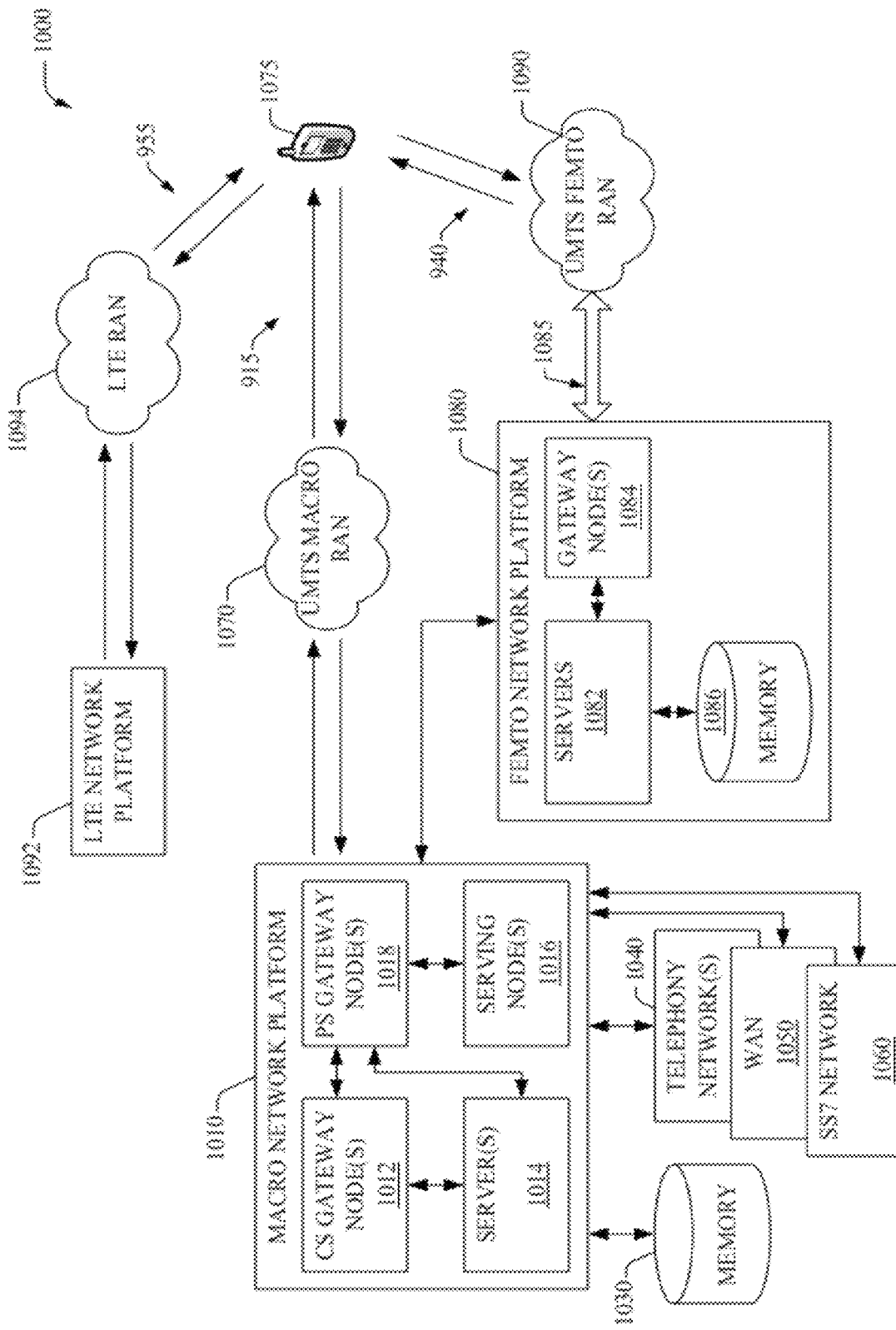
FIG. 10 illustrates a schematic deployment of a macro cell and a femtocell for wireless coverage in accordance with aspects of the disclosure.
Figure 11:
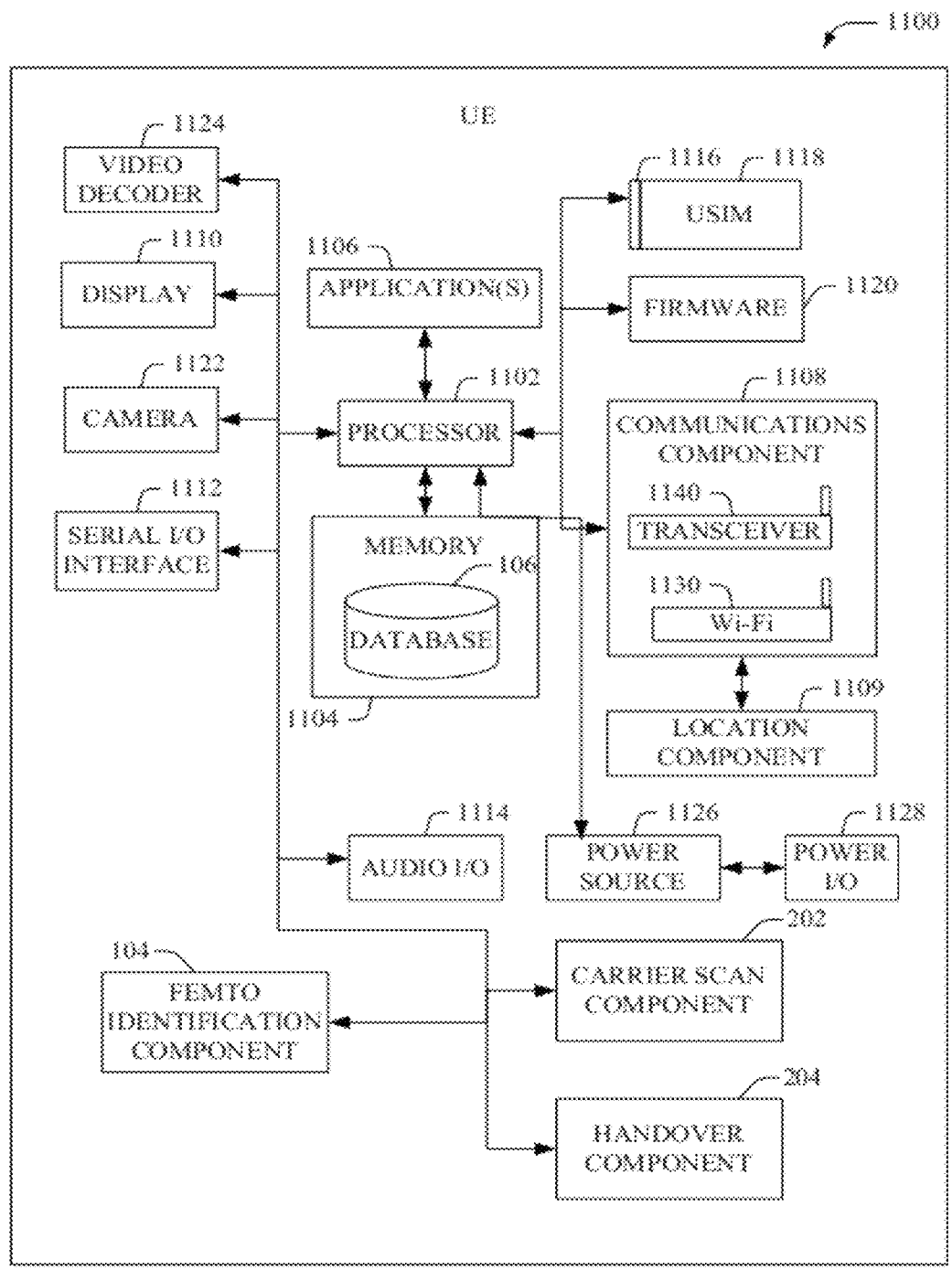
FIG. 11 illustrates an example embodiment of a LTE UE that can handle mobility between LTE and UMTS networks, when a UMTS femtocell is co-channel with a UMTS macro cell.

To provide further context for various aspects of the subject specification, FIGS. 10 and 11 illustrate, respectively, an example wireless communication environment 1000, with associated components for operation of a femtocell, and a block diagram of an example embodiment 1100 of a UE, which can facilitate improved LTE to UMTS femto mobility in accordance with aspects described herein.

Wireless communication environment 1000 includes three wireless network platforms: (i) A macro network platform 1010 that serves (or facilitates communication) with user equipment 1075 via a macro radio access network (RAN) 1070. It should be appreciated that in cellular wireless technologies, macro network platform 1010 is embodied in a Core Network. (ii) A femto network platform 1080, which can provide communication with UE 1075 through a femto RAN 1090 linked to the femto network platform 1080 via backhaul pipe(s) 1085, wherein backhaul pipe(s) are substantially the same a backhaul link 940. (iii) An LTE network platform 1092 that serves (or facilitates communication) with user equipment 1075 via an LTE RAN 1094. It should be appreciated that femto network platform 1080 typically offloads UE 1075 from macro network/LTE network, once UE 1075 attaches to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 905, femto RAN 1090 can comprise multiple femtocell access points like 930, and LTE RAN 1094 can comprise various coverage cells like cell 945. Generally, the LTE network platform 1092 can include components, e.g., nodes, gateways, interfaces, servers, or platforms that facilitate packet-switched (PS) traffic. Further, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Moreover, CS gateway node(s) 1012 interfaces CS-based traffic and signaling and gateway node(s) 1018.

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. It should be further appreciated that the packetized communication can include multiple flows that can be generated through server(s) 1014. Macro network platform 1010 also includes serving node(s) 1016 that convey the various packetized flows of information or data streams, received through gateway node(s) 1018. It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Server(s) 1082 have substantially the same functionality as described in connection with server(s) 1014 and can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femtocell configuration (e.g., devices served through femto RAN 1090; access control lists, or white lists); service policies and specifications; privacy policies; add-on features; and so forth.

Referring now to FIG. 11, there is illustrated a block diagram of a UE 1100 suitable for femtocell identification in accordance with the innovation. The UE 1100 can include a processor 1102 for controlling all onboard operations and processes. A memory 1104 can interface to the processor 1102 for storage of data (e.g., database 106, LAC range 108, carrier scanning thresholds, etc.) and one or more applications 1106 being executed by the processor 1102. A communications component 1108 can interface to the processor 1102 to facilitate wired/wireless communication with external systems (e.g., UMTS femtocell, UMTS macro cell, LTE cell) by employing transceiver 1140. In an aspect, the transceiver 1140 can receive a broadcast message comprising carrier signal LACs. In one example, the communications component 1108 can include a Wi-Fi modem that facilitates communication over a Wi-Fi network. Further, the communications component 1108 interfaces to a location component 1109 (e.g., GPS transceiver) that can facilitate location detection of the UE 1100. Note that the location component 1109 can also be included as part of the communications component 1108.

The UE 1100 can include a display 1110 for displaying content downloaded and/or for displaying text information related to operating and using the device features. A serial I/O interface 1112 is provided in communication with the processor 1102 to facilitate serial communication (e.g., USB, and/or IEEE 1394) via a hardwire connection. Audio capabilities are provided with an audio I/O component 1114, which can include a speaker for the output of audio signals related to, for example, recorded data or telephony voice data, and a microphone for inputting voice signals for recording and/or telephone conversations.

The device 1100 can include a slot interface 1116 for accommodating a Universal subscriber identity module (USIM) 1118. Firmware 1120 is also provided to store and provide to the processor 1102 startup and operational data. The UE 1100 can also include an image capture component 1122 such as a camera and/or a video decoder 1124 for decoding encoded multimedia content. Further, the UE 1100 can include a power source 1126 in the form of batteries, which power source 1126 interfaces to an external power system or charging equipment via a power I/O component 1128. In addition, the UE 1100 can be substantially similar to and include functionality associated with UE 102 described supra. Moreover, UE 1100 can include a femto identification component 104, carrier scan component 202, and handover component 204, which can include respective functionality, as more fully described herein, for example, with regard to systems 100-600.

Figure 12:
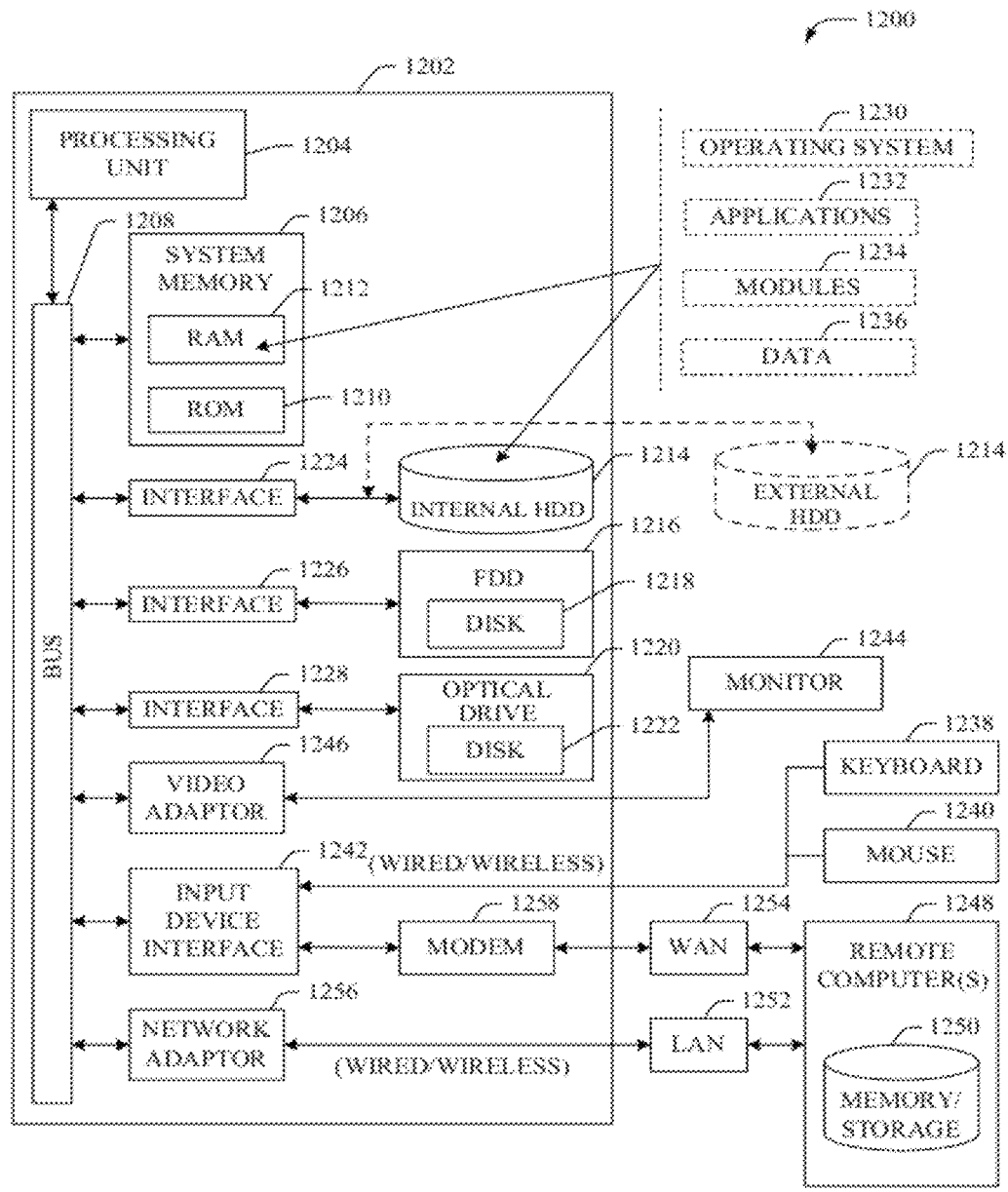
FIG. 12 illustrates a block diagram of a computer operable to execute the disclosed communication architecture.

Referring now to FIG. 12, there is illustrated a block diagram of a computer operable to execute the disclosed communication architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory that stores computer-executable instructions; and
a processor, communicatively coupled to the memory, that facilitates execution of the computer-executable instructions to at least:
in association with a circuit switched fallback, detect two carrier signals that employ a common frequency band;
receive a location area code associated with a first carrier signal of the two carrier signals; and
determine that the first carrier signal is associated with a femtocell, in response to the location area code being included within a preconfigured set of location area codes that are reserved for femtocells.

2. The system of claim 1, wherein the processor further facilitates the execution of the computer-executable instructions to scan a radio environment of a user equipment in response to a radio frequency signal strength of a communication cell, to which the user equipment is connected, satisfying a scanning criterion.

3. The system of claim 1, wherein the processor further facilitates the execution of the computer-executable instructions to facilitate a connection of a user equipment to a femto access point associated with the femtocell.

4. The system of claim 1, wherein the processor further facilitates the execution of the computer-executable instructions to determine that the first carrier signal is associated with a macro cell in response to a determination that the location area code is missing from the preconfigured set of location area codes.

5. The system of claim 4, wherein the processor further facilitates the execution of the computer-executable instructions to facilitate a connection of a user equipment to the macro cell in response to a parameter associated with a communication cell, to which the user equipment is currently coupled, failing a criterion defining a suitability of utilizing the communication cell to communicate with a core mobility network.

6. The system of claim 4, wherein the processor further facilitates the execution of the computer-executable instructions not to facilitate a connection of a user equipment to the macro cell in response to a parameter associated with a communication cell, to which the user equipment is currently coupled, satisfying a criterion defining a suitability of utilizing the communication cell to communicate with a core mobility network.

7. The system of claim 1, wherein the processor further facilitates the execution of the computer-executable instructions to trigger a scan of a radio environment of a user equipment to facilitate a detection of the two carrier signals in response to a determination that a wireless fidelity connection has been established by the user equipment.

8. The system of claim 2, wherein the scanning criterion facilitates the scan of the radio environment during a time period for which the radio frequency signal strength of the communication cell is sufficient to facilitate a communication with the user equipment.

9. A method, comprising:
measuring, by a system comprising a processor, a carrier signal of a neighboring communication cell in association with a circuit switched fallback;
comparing, by the system, a location area code associated with the carrier signal with a preconfigured set of location area codes that are reserved for femtocells; and
determining that the neighboring communication cell is a femtocell in response to the location area code being determined to be included within the preconfigured set of location area codes.

10. The method of claim 9, further comprising:
triggering, by the system, the measuring in response to detecting that a determined strength of a radio frequency signal of a serving cell satisfies a criterion.

11. The method of claim 9, further comprising:
receiving, by the system, the preconfigured set of location area codes via an over-the-air update.

12. The method of claim 9, further comprising:
determining, by the system, that the neighboring communication cell is a macro cell in response to the location area code being determined to be excluded from the preconfigured set of location area codes.

13. The method of claim 9, further comprising:
subsequent to the determining, performing, by the system, a transfer of communication link from a serving cell to the femtocell.

14. The method of claim 12, further comprising:
starting, by the system, a timer, in response to the determining that the neighboring communication cell is a macro cell.

15. The method of claim 14, further comprising:
identifying, by the system, a camping suitability of a serving cell.

16. The method of claim 15, further comprising:
performing, by the system, a transfer of a communication link from the serving cell to the macro cell, in response to the camping suitability failing to satisfy a camping criterion.

17. The method of claim 15, further comprising:
resetting, by the system, the timer, in response to the serving cell satisfying a predefined camping criterion; and
denying, by the system, a transfer of a communication link from the serving cell to the macro cell in response to the resetting.

18. The method of claim 9, further comprising:
detecting, by the system, a connection with a wireless fidelity network, wherein the measuring includes measuring the carrier signal of the neighboring communication cell in response to the detecting.

19. A non-transitory computer readable storage medium comprising computer-executable instructions that, in response to execution cause a system comprising a processor to perform operations, comprising:
scanning a radio environment for carrier signals associated with a specified frequency number in association with a circuit switched fallback;
and
determining a first carrier signal of the carrier signals is associated with a femtocell based in part on comparing a location area code associated with the first carrier signal with a preconfigured set of location area codes that are reserved for femtocells.

20. The non-transitory computer readable storage medium of claim 19, wherein the operations further comprise:
in response to the determining, facilitating a transfer of a communication link from a serving cell to the femtocell independent of a signal strength of the serving cell being determined to fail to satisfy a criterion defining a suitability of utilizing the communication cell to communicate with a core mobility network.

* * * * *